Nov. 28, 1967 J. S. MILNE 3,355,062
CONTAINER CLOSURE SEAM
Filed Oct. 10, 1962
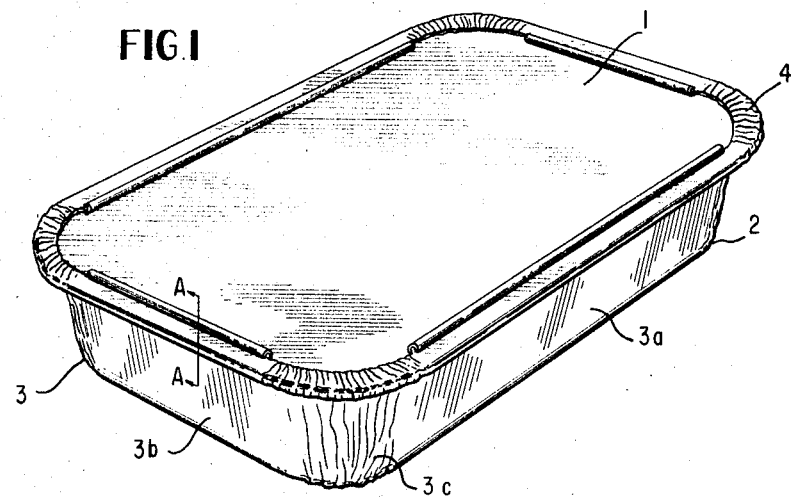
FIG.1
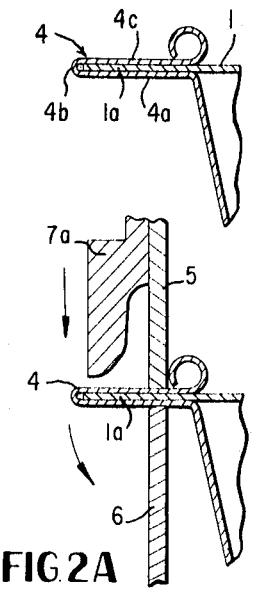
FIG.1A
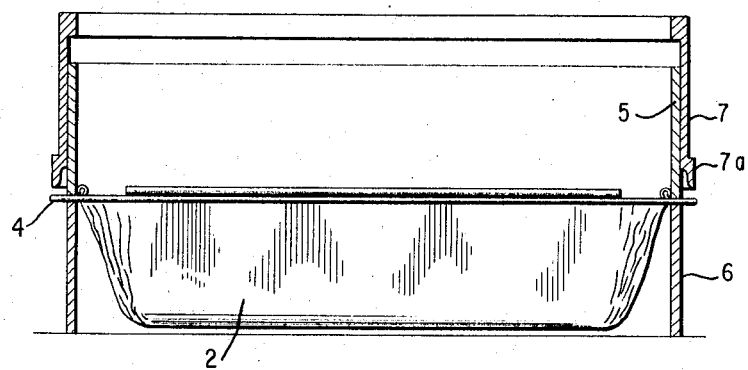
FIG.2
FIG.2A
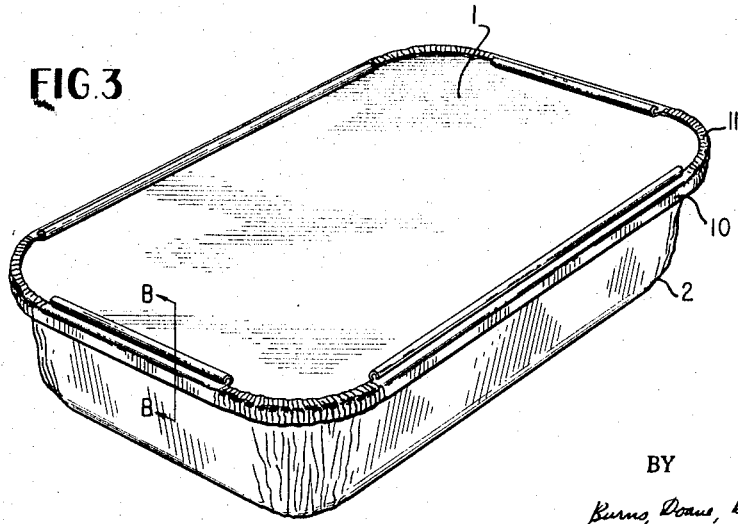
FIG.3
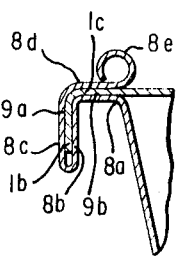
FIG.3A
INVENTOR.
JOHN S. MILNE
BY
Burns, Doane, Benedict, Swecker & Mathis
ATTORNEYS United States Patent Office 3,355,062
Patented Nov. 28, 1967

3,355,062
CONTAINER CLOSURE SEAM
John S. Milne, Chicago, Ill., assignor to Monsanto
Company, a corporation of Delaware
Filed Oct. 10, 1962, Ser. No. 229,591
7 Claims. (Cl. 220—67)

This invention pertains to a container and a method for its fabrication. In particular, the invention pertains to a container comprising a thin walled, metallic foil receptacle and a thin walled plastic cover and a method for effectively connecting the cover to the receptacle.

Thin walled containers are employed commercially on a large scale in the packaging of food and other materials. One such container which has been found to be particularly effective is featured in the United States Blane Patent 2,960,255. The container disclosed in this patent includes a receptacle fabricated of thin metallic foil material, such as aluminum foil, and a thin closure. The closure is secured to the receptacle by a lip structure having interconnected, superposed layers defining a U-shaped cavity opening toward the center of the receptacle. The peripheral edge of the cover extends into this cavity and is intended to be secured by an indentation.

The several advantages attendant upon the Blane structure notwithstanding, the manner in which the Blane cover is secured to its associated receptacle has presented substantial problems. It is conventional for these containers to be stacked in layers several units high. Such stacking, and ordinary handling, has tended to cause the cover edges to separate from the lip defined cavity and thus expose the container contents or allow the cover to sag into the containers. The generally planar nature of the lip of the Blane structure has made it vulnerable to unsightly bending and distortion. This lip structure is difficult to grasp and consumes a substantial amount of space about the periphery of the container.

In recognition of the need for an improved container structure, it is an object of this invention to provide a container and method for its fabrication which substantially eliminate the deficiencies of prior art structures of the type described above.

It is the particular object of the invention to provide a container and method of container fabrication by means of which an improved connection between a thin walled receptacle and a thin walled cover is achieved.

It is a further object of this invention to provide such a container and fabrication method by means of which a container is strengthened and made less vulnerable to lip deformation.

It is also an object of the invention to provide an improved container structure and method of container fabrication which results in a reduction of container size.

A still further object of this invention is to provide a container and method of container fabrication which facilitates container gripping and handling.

A final object of the invention is to provide a container structure characterized by a substantially improved physical appearance.

In accomplishing the objects of this invention a container structure is envisioned including a thin walled receptacle having side wall means and lip means projecting therefrom adjacent a receptacle opening. The lip means are configured to form an L-shaped cavity. A first portion of the lip means extends laterally outwardly of the receptacle side wall means, away from the receptacle opening. A second portion of the lip means extends substantially perpendicular to the first portion and is spaced from and disposed opposite to the container side wall means. A third lip means portion extends from the second portion toward and substantially perpendicular to the plane of the first portion. This third portion cooperates with the second portion to form one leg of the L-shaped cavity. A fourth lip means portion extends from the third portion inwardly toward the opening of the receptacle and is substantially parallel to the first portion. This fourth portion cooperates with the first lip means portion to form the other leg of the L-shaped cavity. The second and third lip means portions define a rim spaced from and disposed opposite to the receptacle side wall means.

A thin walled cover is provided which is adapted to close the receptacle opening. This cover has a peripheral edge extending into each leg of the L-shaped cavity. An outer edge portion of the cover is gripped between the second and third lip means portions while an inner edge portion of the cover is gripped by the first and fourth lip means portions.

In fabricating a container as described above, the peripheral edge of a container cover and interconnected portions of a receptacle lip which are disposed on opposite sides of the cover edge so as to define a U-shaped, cover-edge receiving cavity are clamped together. In this clamped position, the peripheral edge portion of the cover and the lip portions are aligned and thus substantially parallel. Subsequent to the clamping, force is exerted outwardly of the clamped cover and lip portions, in relation to the opening of the receptacle, against superimposed lip and cover portions which project freely outwardly from the clamped portions. This force sharply deflects the projecting lip and cover portions into a rim extending substantially perpendicular to the clamped cover and lip portions, which rim is spaced from the receptable side wall means.

In describing the invention, reference will be made to a preferred embodiment of the container and a preferred fabrication technique, both of which are illustrated in the accompanying drawings.

In the drawings:

FIGURE 1 is a perspective view of a container structure prior to its modification according to the teaching of the present invention;

FIGURE 1A is a fragmentary, sectional view of the container shown in FIGURE 1 as viewed along the line A—A of FIGURE 1;

FIGURE 2 is a sectioned, schematic elevational view of a representative apparatus for modifying the container shown in FIGURE 1 in accordance with the teaching of the present invention;

FIGURE 2A is an enlarged, fragmentary view of the apparatus illustrated in FIGURE 2;

FIGURE 3 is a perspective view of a container structure improved according to the teaching of the present invention;

FIGURE 3A is a fragmentary, sectional view of the improved container structure viewed along the line B—B of FIGURE 3.

A container of the type featured in the aforementioned Blane patent is illustrated in FIGURE 1. This container comprises a cover 1 and a receptacle 2.

Receptacle 2 includes side wall means 3 projecting from a base (not shown). Side wall means 3 has generally rectilinear and planar side wall portions such as side wall 3a and end wall 3b and interspersed, rounded corners such as the corner portion 3c interconnecting side portions 3a and 3b.

Extending from the outer, i.e., free, end of the side wall means is a lip structure 4. This lip structure 4, as shown in FIGURE 1A, includes an outwardly bent portion 4a which is turned back on itself at corner 4b to terminate in an inwardly directed portion 4c lying parallel to portion 4a and slightly spaced therefrom. As shown in FIGURE 1A, portions 4a and 4c cooperate to define a generally U-shaped cavity extending around the periphery of the receptacle 2 and facing the receptacle opening to receive a peripheral edge 1a of the cover 1.

Cover 1 has an edge configuration corresponding in shape to, but slightly smaller than, the lip configuration defined by the lip portion 4a. Thus, the peripheral edge 1a is snugly secured within the U-shaped cavity defined by the lip portions 4a and 4c so as to entirely seal the receptacle opening.

In order to improve the manner in which the cover 1 is secured to the receptacle 2, and improve the strength and appearance of the overall container structure, an outermost portion of the peripheral lip structure is deflected downwardly to provide a cover gripping rim spaced from the container side wall portions which is substantially perpendicular to the body of the cover 1 and plane of the original lip structure.

To form a container reinforcing and cover securing rim as described above, there may be employed an apparatus of the type schematically illustrated in FIGURE 2. This apparatus includes an upper clamping member 5 and a lower clamping member 6. Members 5 and 6 are generally annular in character and are configured to conform to the general configuration of the lip 4.

As shown in FIGURE 2A, members 5 and 6 engage the lip portions 4c and 4a, respectively, adjacent the side wall portions of the receptacle 2. Clamping members 5 and 6 engage and clamp the superposed lip portions 4a and 4c and the interposed cover edge 1a so as to leave projecting lip and cover portions extending outwardly away from the receptacle opening. The freely projecting lip and cover portions extending away from the clamping members 5 and 6 desirably have a width at least as great as that of the clamping members 5 and 6.

With the receptacle lip and inserted cover 1 clamped as shown in FIGURE 2, the rim structure in question may be formed by a force applied through a die member such as the member 7 schematically illustrated in FIGURES 2 and 2A. Die member 7 is telescopingly mounted in relation to clamp member 5 so that it may move downwardly toward the projecting lip and cover portions. As shown in FIGURE 2A, a lip engaging portion 7a of the die 7 is about to engage the freely projecting lip and cover portions extending beyond the clamping members 5 and 6 so as to sharply deflect these projecting portions downwardly toward the receptacle base.

FIGURES 3 and 3A illustrate the container after the downwardly moving die member 7 has formed the desired rim structure. The deflecting force imposed by the moving die 7 has caused the lip 4 to be bent into a generally L-shaped configuration so that the generally planar lip structure 4 is replaced by a generally L-shaped lip structure 8 extending around the container periphery.

L-shaped lip structure 8 includes a first lip portion 8a projecting laterally of the receptacle side wall, which portion desirably lies in a plane paralleling the receptacle base. A second portion 8b extends from the first portion 8a and is generally perpendicular to the portion 8a. Portion 8b is spaced from the adjacent receptacle side wall and is disposed opposite thereto. A third portion 8c extends from the second portion 8b upwardly toward and perpendicular to the plane of the first portion 8a. A fourth portion 8d extends from the third portion 8c to project back toward the opening of the receptacle in a plane paralleling the first portion 8a. In the preferred container structure, along at least parts of the lip 8 a fifth lip portion 8e extends from the fourth portion 8d away from portion 8a. Portion 8e is displaced inwardly of portion 8c and lies substantially above the container side wall.

Portions 8b and 8c of the container lip structure are spaced so as to define one leg 9a of an L-shaped cavity 9. Lip portions 8a and 8d are spaced and cooperate to define the other leg 9b of this L-shaped cavity. Peripheral edge portion 1a of cover 1, through the deflecting action of die 7, is formed into an L-shape so as to have a portion 1b extending into leg 9a and a portion 1c extending into leg 9b of cavity 9.

Lip portions 8b and 8c and interposed cover portion 1b, as illustrated in FIGURES 3 and 3A, cooperate to define a rim 10 spaced from and disposed opposite to the receptacle side wall. Rim 10 is connected to the receptacle side wall by a substantially planar lip portion 11 formed by the superposed lip portions 8a and 8d and the interposed cover portion 1c. Desirably, rim 10 has a width at least as great as that of lip portion 11.

With the lip and rim configuration shown in FIGURE 3A, the outermost edge portion 1b of the cover 1 is gripped between the lip portions 8b and 8c. The cover edge portion 1c, disposed immediately inwardly of the portion 1b, is gripped between the lip portions 8a and 8d. Thus, two gripping forces are directed in right angled relation against the cover edge.

In the preferred form of the invention the receptacle 2 is fabricated of thin aluminum foil. The foil thickness contemplated is on the order of a few thousandths of an inch. In the type of container presently under consideration, the wall thickness ordinarily would not exceed .010 inch.

While a variety of materials may be employed in the fabrication of the cover 1, a preferred material is bi-oriented, polystyrene film. A satisfactory thickness for covers fabricated of this material is on the order of a few thousandths of an inch. It would be expected that the thickness could range from .002 inch upward to .010 inch.

Thin aluminum foil of the type described, when formed into a lip structure as shown in FIGURE 1A and even when indented, is incapable of exerting a sufficient clamping action upon the edge of the cover 1. Thin cover members of the type described are of such a filmy or limp character as to lack meaningful planar rigidity. Thus, when a downward force is imposed upon a cover 1, it tends to flex or sag and cause the withdrawal of the cover edge from a lip structure of the type illustrated in FIGURE 1A. Even ordinary handling may be sufficient to cause a deflection of the cover 1 of such a magnitude as to separate the cover from its lip structure or to cause the cover to sag inwardly into the receptacle contents. As will be readily appreciated, such sagging presents an unsightly appearance. Where sufficient cover sagging occurs to cause the cover to actually engage container contents such as food materials, it is likely that customers would be discouraged from purchasing the container and its contents.

The cover securing structure shown in FIGURE 3A has been found to effectively avoid the cover securing and sagging problems associated with the FIGURE 1A structure. This dual and right-angle directed gripping action of the L-shaped lip structure has been found to effectively secure covers in a taut condition and prevent their separation from receptacle lips even when substantial forces are directed against the cover. It is particularly significant that this improved holding action is achieved without resorting to cover and receptacle bonding techniques or to covers having preformed configurations adapted to obtain a locking or securing action.

The improved cover securing structure, in addition to providing a materially enhanced degree of cover retention, significantly improves the strength of the container. The rim 10 defined by the deflected lip portions 8b and 8c and the interposed cover edge portion 1b significantly strengthens the upper portion of the container and provides a unique degree of container rigidity. In addition, unsightly lip bending and indenting which was likely to occur with the FIGURE 1A structure under routine handling conditions is deterred by the cover gripping and reinforcing rim characterizing the FIGURE 3A structure. Where the beaded lip portion 8e is present, a unique and highly effective dual reinforcement extending along opposite edges of lip portion 11 is provided.

The rim of the improved structure is somewhat spaced from the receptacle side wall. Thus, in handling the container, a user may partially insert fingers or a thumb in the space between the rim and the receptacle side wall so as to obtain a more positive hold on the container.

The deflecting of a portion of the container lip to form the downwardly projecting rim structure reduces the lateral dimensions of the receptacle so as to conserve on shipping and storage space. In addition, it is considered that the forming of the rim materially improves the esthetic appearance of the container in providing neat and well-defined peripheral surfaces.

While the invention has been described with reference to preferred article and fabrication technique embodiments, certain departures from the disclosed structure and technique may occur to those skilled in the art. For example, thin materials other than those specified may be employed in the fabrication of certain types of containers. Specifically, it is contemplates that such materials as papers, cardboard, foil, or plastics other than polystyrene may be employed in fabricating the container cover.

While the container has been disclosed as having a generally polygonal or rectangular configuration, the invention is adaptable to containers possessing other geometric shapes.

Preferably the rim structure is continuous and uniform in character. However, in certain circumstances it may be desirable to form the rim so as to be discontinuous in character or to have varying widths about the periphery of a container.

Modifications such as those described, as well as other additions, deletions and changes in the preferred embodiments, fall within the purview of the invention as defined in the appended claims.

I claim:
1. A container comprising:
   a thin walled receptacle having side wall means and lip means extending therefrom adjacent a receptacle opening;
   said lip means being configured to form a generally L-shaped cavity, said L-shaped cavity being defined by
      a first portion of said lip means extending laterally outwardly of said side wall means, away from said receptacle opening,
      a second portion extending from said first portion substantially perpendicular thereto, said second portion being spaced from and extending opposite said side wall means,
      a third portion extending from said second portion, toward and substantially perpendicular to the plane of said first portion, said third portion cooperating with said second portion to form one leg of said L-shaped cavity,
      and a fourth portion extending from said third portion inwardly toward the opening of said receptable and being substantially parallel to said first portion, said fourth portion cooperating with said first portion to form the other leg of said L-shaped cavity;
   said second and third lip means portions defining a rim spaced from and disposed opposite to said receptacle side wall means; and
   a thin walled cover adapted to close said receptacle opening;
   said thin walled cover having a peripheral edge extending into each leg of said L-shaped cavity with an outer edge portion being gripped by said second and third lip means portions and an inner edge portion being gripped by said first and fourth lip means portions.

2. A container as described in claim 1 wherein said receptacle includes substantially planar side wall portions interspersed with rounded corners so as to define a substantially polygonal container configuration.

3. A container as described in claim 1 wherein said receptacle is formed of aluminum foil and wherein said cover is formed of bioriented polystyrene film.

4. A container as described in claim 3 wherein said aluminum foil has a thickness not exceeding approximately .010 inch and wherein said bioriented polystyrene film has a thickness not exceeding approximately .010 inch.

5. A container as described in claim 1 wherein said second portion of said lip means of said receptacle is at least as wide as the width of said first portion.

6. A container as described in claim 1 wherein said lip means includes a fifth beaded portion extending from said fourth portion away from said first portion, said fifth portion being displaced inward of said third portion toward said receptacle opening and lying above said receptacle side wall means.

7. A container as described in claim 1:
   wherein said receptacle includes substantially planar side wall portions interspersed with rounded corners so as to define a substantially polygonal container configuration;
   wherein said receptacle is formed of aluminum foil having a thickness not exceeding approximately .010 inch and wherein said cover is formed of bioriented polystyrene film having a thickness not exceeding approximately .010 inch;
   wherein said lip means includes a fifth beaded portion extending from said fourth portion away from said first portion, said fifth portion being displaced inward of said third portion toward said receptacle opening and lying substantially above said receptacle side wall means; and
   wherein said second portion of said lip means of said receptacle is at least as wide as the width of said first portion and continuously encircles the periphery of said container.

References Cited

UNITED STATES PATENTS

| | | | |
|---|---|---|---|
| 417,813 | 12/1899 | Davidson | 220—77 |
| 1,647,289 | 11/1927 | Gwinn | 206—45.32 |
| 2,041,537 | 5/1936 | Frost | 206—45.32 |
| 2,623,685 | 12/1952 | Hill | 229—5.5 X |
| 2,674,636 | 4/1954 | Fisher | 220—67 |
| 2,849,148 | 8/1958 | Lohuis | 220—67 |
| 2,960,255 | 11/1960 | Blane | 220—67 |
| 3,106,808 | 10/1963 | Landham | 53—42 |
| 3,120,728 | 2/1964 | Snow et al. | 53—42 |

FOREIGN PATENTS 20,470   4/1907   Norway.

OTHER REFERENCES

Modern Packaging, July 1959, pp. 116–118, "Polymer-coated Polystyrene," Scopp and Black.

Rubber World, "Stretch Orientation of Polystyrene and its Interesting Results," Bailey, pp. 225–230, May 1948.

"Elements of Strength of Materials," Timoshenko and MacCullough Van Nostrand, pp. 118–127, June 1951, New York.

THERON E. CONDON, *Primary Examiner.*

EARL J. DRUMMOND, FRANKLIN T. GARRETT, *Examiners.*

J. L. KRUTER, R. H. SCHWARTZ, *Assistant Examiners.*